J. McMYLER.
CAR TILTING APPARATUS.
APPLICATION FILED APR. 8, 1915.
1,253,068.
Patented Jan. 8, 1918.
2 SHEETS—SHEET 1.
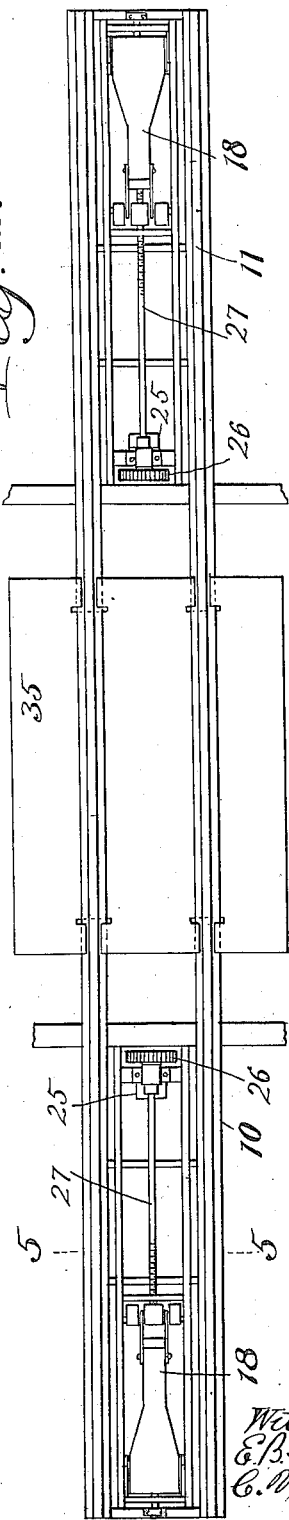
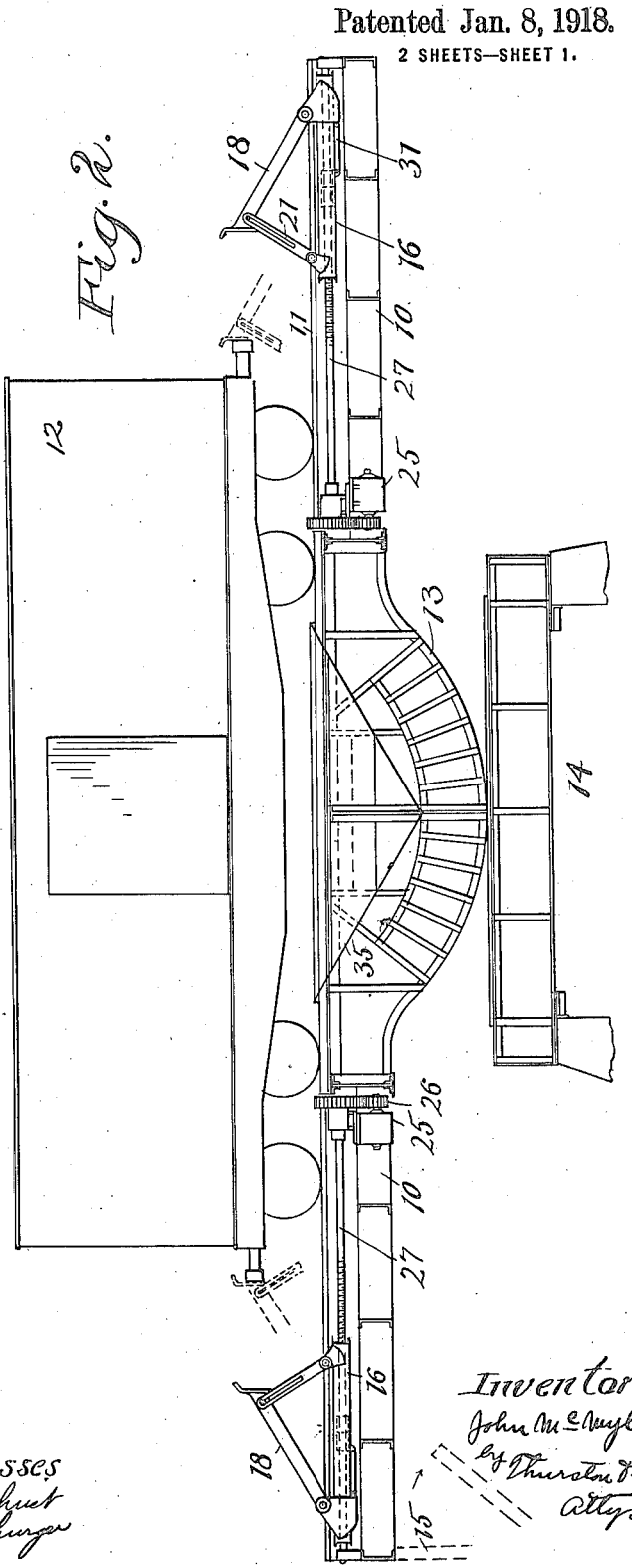

J. McMYLER.
CAR TILTING APPARATUS.
APPLICATION FILED APR. 8, 1915.
1,253,068.
Patented Jan. 8, 1918.
2 SHEETS—SHEET 2.
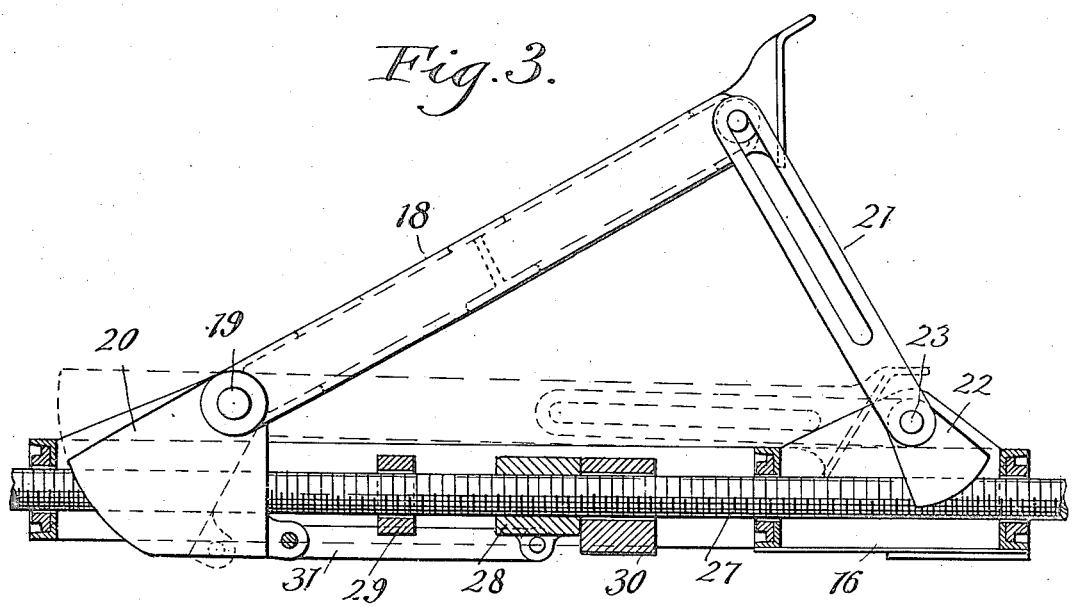
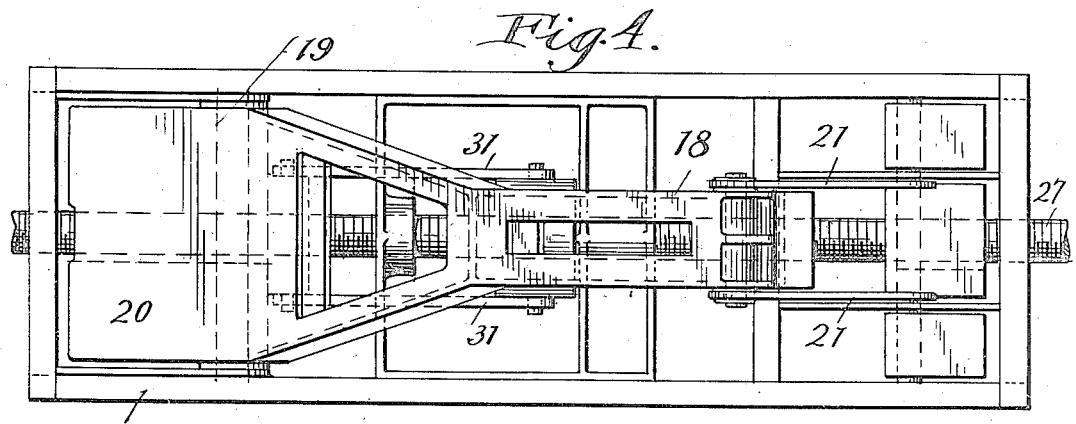
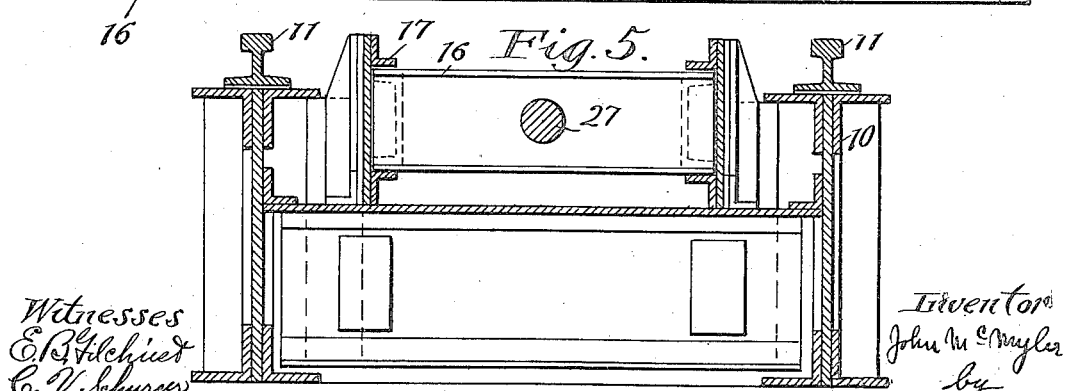

UNITED STATES PATENT OFFICE.

JOHN McMYLER, OF CLEVELAND, OHIO, ASSIGNOR TO THE McMYLER INTERSTATE COMPANY, OF CLEVELAND, OHIO, A CORPORATION OF OHIO.

CAR-TILTING APPARATUS.

1,253,068.  Specification of Letters Patent.  Patented Jan. 8, 1918.

Application filed April 8, 1915. Serial No. 19,851.

*To all whom it may concern:*

Be it known that I, JOHN McMYLER, a citizen of the United States, residing at Cleveland, in the county of Cuyahoga and State of Ohio, have invented a certain new and useful Improvement in Car-Tilting Apparatus, of which the following is a full, clear, and exact description.

This invention relates to car tilting mechanism, and is adapted particularly as a box car unloader adapted to receive and tilt a box car in such a way that the contents thereof may be discharged through the side door or doors.

More specifically considered, this invention relates to that type of car tilting apparatus which includes a tilting platform on which the car is adapted to be run, and which is adapted to be rocked or tilted first in one direction and then in another about a trunnion or rolling support provided at the middle portion of the platform. Additionally, this type of apparatus includes car shifting and retaining devices which are provided on opposite ends of the platform and are adapted to engage the ends of the car so as to properly position the same on the platform and to retain the car thereon while the platform and car are tilted.

The present invention resides particularly in the car shifting and holding means, and has for its chief object to provide devices of this character which are efficient and reliable and which are so constructed and operated that they may be independently controlled and may be utilized not only for the purpose of positioning the car and for retaining the same on the platform, but for shifting the empty car from the platform.

In carrying out the above objects I provide a tiltable platform which is provided at or adjacent its ends with a pair of car shifting and retaining devices movable lengthwise of the track of the platform toward and from each other and controlled by separate motors, each operatively connected to one of the shifting and retaining devices so that these devices may be brought up against the ends of the car to hold the same in place, and may be separately operated to place the car in any desired position, or to shift the car from the platform.

Preferably, each of these shifting and holding devices includes a sliding frame and a pivoted car engaging arm which is connected to the motor in such a manner that when the motor is set in operation this arm is first shifted to or from operative position as the case may be, and thence the car shifting and holding device as a whole is moved endwise along the track.

My invention may be further briefly summarized as consisting in certain novel details of construction and combinations and arrangements of parts which will be described in the specification and set forth in the appended claims.

In the accompanying sheet of drawings, Figure 1 is a top plan view of a car tilting apparatus embodying my invention; Fig. 2 is a side view of the car showing a box car on the platform; Fig. 3 is a side view with parts in vertical longitudinal section showing the car shifting and holding device; Fig. 4 is a plan view of the same; and Fig. 5 is a transverse sectional view on an enlarged scale substantially along the line 5—5 of Fig. 1.

The car tilting apparatus includes a tilting platform designated as a whole by the reference character 10, which platform is provided with a track 11 on which a car such as a box car 12 is adapted to run. This platform may be supported at or about the center thereof in numerous ways, but in this case the platform is provided at the center with a rounded or arc-shaped bearing portion 13 which is supported by and rolls on a fixed horizontal base 14. I have not shown any specific means for tilting or rocking the platform on the base 14, as the tilting means constitutes no part of the present invention, and any suitable means may be employed.

In addition to the center supporting means provided by the parts 13 and 14, it is customary to support the ends of the platform previous to the tilting of the platform by means of some form of support 15, which may be raised in upright position beneath the ends of the platform, or swung downward or otherwise lowered out of the way of the platform so that the latter may be tilted.

At the ends of the platform there are provided two car shifting and holding devices, each of which includes a sliding frame 16 adapted to be moved longitudinally of the track 11 in guideways 17 (see particularly Figs. 3, 4 and 5) arranged between the rails of the track 11. Each sliding frame 16 carries a pivoted car engaging arm 18 pivoted at 19, and provided at its rear end with a counterweight 20. This arm when in car engaging position occupies the position shown by full lines in Fig. 3, and when in inoperative position is substantially horizontal, as shown by the dotted line position. A double link 21 provided at its lower end with a counterweight 22 is pivoted at 23 to the forward end of the sliding frame 16 and has a pin and slot connection with the forward end of the arm 18, this link being provided for the purpose of limiting the upward swinging movement of the arm.

The two car shifting and retaining devices are operated independently by separate motors 25, preferably electric motors (see Figs. 1 and 2), which motors are carried by the platform, and are connected by gearing 26 to screws or threaded shafts 27 which are located midway between the tracks and extend from the motors toward the ends of the platform. Each of these screws or threaded shafts extends through the several cross or transverse members of one of the sliding frames 16, and each carries a traveling nut 28 which is located between a pair of transverse members 29 and 30 of the frame 16, and is connected by links 31 to the counterweighted part of the pivoted arm 18. When the arm 18 is in horizontal position, the nut bears against the cross member 29, and when the arm is in elevated position shown in Fig. 3 the nut bears against the cross member 30.

Assuming that the arm is in inoperative or horizontal position, if the motor 25 is started in a forward direction, the nut travels along the threaded shaft 27 between the cross members 29 and 30 until it engages the cross member 30. In traveling the predetermined distance between these cross members, it raises the arm 18 from the horizontal position to its inclined elevated position, but as soon as the nut engages the cross member 30 the continued rotation of the shaft 27 causes the entire car shifting and retaining device, including the frame and arm to move toward the center of the platform or toward the car which may be standing on the platform. On the other hand when the motor is rotated in the reverse direction, the arm 18 will first be lowered until it reaches the horizontal position or until the nut engages the cross member 29 whereupon the entire car shifting and holding device is moved along the guideway toward the end of the platform. In the use of this mechanism, and assuming that the loaded car has been placed on the platform, both motors will be started, and this will cause the arms 18 to be elevated to a height such that the upper ends of the arms will be in a position to engage the bumpers of the car, and thence the sliding frames are moved inwardly toward each other until the arms engage the bumpers, and when this occurs the motors will be stopped. The stopping of the motors can be done either manually or automatically.

By reason of the independent control of the car shifting and retaining devices, the car can be placed on the platform in any desired position. When the car is in the proper position and the retaining devices are in place against the bumpers the platform will be tilted first in one direction and then in the other, so as to cause the contents of the car to be moved toward the side doors of the car. By any suitable diverter or unloading conveyer placed in the doorway of the car, the material may be caused to be discharged from the car into a suitable receiving pan or chute 35 with which the middle portion of the platform is provided.

By providing means for separately operating the two car shifting and holding devices, not only can the box car be placed on the platform in any desired position, but I can use these devices for shifting or "kicking" the empty car off the platform. Assuming that the car is empty and it is desired to shift the car off the platform, say, toward the left, the motor connected to the left hand shifting and holding device is started so as to lower the arm out of the way of the car, and thence the motor connected to the other shifting and retaining device is operated so as to move the car toward the discharge end and to give it sufficient "kick" as to cause it to pass from the platform on to the receiving track.

Having thus described my invention, what I claim is:—

1. In a car tilting apparatus, a tiltable platform, a pair of car shifting and holding devices, movable along the platform and adapted to engage opposite ends of a car on the platform, and motor operated means for shifting said devices independently.

2. In a car tilting apparatus, a tiltable platform, a pair of car shifting and holding devices carried by the platform at opposite ends thereof, and each comprising a sliding frame movable in the direction of the length of the platform, and a car engaging member supported by and movable relative to the frame and adapted to be shifted to and from a position to engage the end of a car.

3. In a car tilting apparatus, a tiltable platform, a pair of car shifting and holding devices carried by the platform adjacent opposite ends thereof, and each comprising a sliding frame movable in the direction of the length of the platform and a car engaging member supported by and movable relative to the frame and adapted to be moved to and from a position to engage the end of a car, and motive means for operating said devices so as to move said car engaging members and shift the frames lengthwise of the platform.

4. In a car tilting apparatus, a tiltable platform, a pair of car shifting and holding devices carried by the platform adjacent opposite ends thereof and each comprising a sliding frame movable in the direction of the length of the platform and a car engaging member supported by and movable relative to the frame and adapted to be moved to and from a position to engage the end of a car, and a pair of motors separately connected to said devices for independently operating the same.

5. In a car tilting apparatus, a tiltable platform, a pair of car shifting and holding devices on the platform adjacent opposite ends thereof, and each comprising a sliding frame movable lengthwise of the platform and an arm pivoted to the frame, and motive means connected to each device for swinging the arm, and for shifting the frame.

6. In a car tilting apparatus, a tiltable platform, a car shifting and holding device on the platform including a frame movable lengthwise of the platform, an arm pivoted to the frame and adapted to be swung to or from car engaging position, and means for operating said device, comprising a motor and operating mechanism connected to the motor and to said device and including means for first shifting said arm and for then moving the frame and arm along the platform.

7. In a car tilting apparatus, a tiltable platform, a car shifting and holding device, comprising a frame movable lengthwise of the platform, an arm pivoted to the frame adjacent one end thereof and movable to and from car engaging position, a link pivoted to the frame adjacent the opposite end thereof and having a pin and slot connection with the arm, and means operatively connected to the device for swinging the arm and shifting the frame toward or from the end of the platform.

8. In a car tilting apparatus, a tiltable platform having track rails, a car shifting and holding device, comprising a frame movable lengthwise of the platform between the rails, an arm pivoted to the frame and adapted to engage the end of a car, means for shifting the frame along the platform and for swinging the arm relative to the frame to a position to engage the end of a car or to a position such that the car may pass over the arm, comprising a motor, a screw connected to the motor, a nut on the screw connected to the arm and means for limiting the travel of the nut relative to the frame.

9. In a car tilting apparatus, a tiltable platform supported between its ends for tilting movement and provided with track rails, a pair of car shifting and holding devices on the platform adjacent opposite ends thereof and located between the track rails, said devices including members adapted to engage opposite ends of a car, and means for independently controlling said devices, comprising a pair of motors, a pair of threaded shafts adapted to be rotated by the motors and extending lengthwise of the platform, said shafts being operatively connected to the two car shifting and holding devices.

10. In a car tilting apparatus, a tiltable platform supported between its ends for tilting movement and provided with track rails, a pair of car shifting and holding devices on the platform adjacent opposite ends thereof, and each comprising a frame movable endwise between the track rails and an arm pivoted to the frame and adapted to be swung upwardly so as to engage the end of a car and downwardly so that the car may pass over the same, and means for separately controlling said devices, comprising a pair of motors, a pair of threaded shafts adapted to be driven by the motors and extending lengthwise of the platform and separately connected to the two pivoted arms.

11. In a car tilting apparatus, a platform tiltable about a transverse axis and provided with track rails, a car shifting and holding device between the rails and including a frame movable lengthwise of the platform between the rails and a car engaging member connected to the frame and movable upwardly to a position to engage the end of a car and downwardly so that the car can pass over the same.

In testimony whereof, I hereunto affix my signature in the presence of two witnesses.

JOHN McMYLER.

Witnesses:
F. W. LOVELL,
A. F. KWIS.